United States Patent
Shen

(10) Patent No.: US 7,197,918 B2
(45) Date of Patent: Apr. 3, 2007

(54) APPARATUS AND METHOD FOR EVALUATING FUEL INJECTORS

(75) Inventor: Yunbiao Shen, Westmont, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 10/641,379

(22) Filed: Aug. 14, 2003

(65) Prior Publication Data

US 2005/0034514 A1   Feb. 17, 2005

(51) Int. Cl.
*G01M 15/00* (2006.01)
(52) U.S. Cl. .................................... 73/119 A
(58) Field of Classification Search ............ 73/116, 73/118.1, 119 A, 117.2, 117.3, 119 R, 112, 73/113, 115; 701/104
See application file for complete search history.

(56) References Cited

U.S. PATENT DOCUMENTS

| | | | |
|---|---|---|---|
| 4,061,027 A | 12/1977 | Emerson | |
| 4,337,650 A | 7/1982 | Brandt | |
| 4,488,429 A * | 12/1984 | Ito ............................. | 73/119 A |
| 4,559,821 A | 12/1985 | Engeler et al. | |
| 4,712,421 A | 12/1987 | Young | |
| 4,721,247 A | 1/1988 | Perr | |
| 4,788,858 A * | 12/1988 | Liebermann ............... | 73/119 A |
| 4,845,979 A * | 7/1989 | Farenden et al. ......... | 73/119 A |
| 5,000,043 A * | 3/1991 | Bunch et al. ............. | 73/119 A |
| 5,359,883 A | 11/1994 | Baldwin et al. | |
| 5,412,981 A | 5/1995 | Myers et al. | |
| 6,443,104 B1 | 9/2002 | Simescu et al. | |
| 6,497,223 B1 | 12/2002 | Tuken et al. | |
| 6,546,782 B1 | 4/2003 | DeLaCruz et al. | |
| 6,622,549 B1 * | 9/2003 | Wlodarczyk et al. ..... | 73/119 A |
| 6,712,047 B2 * | 3/2004 | Rueger ....................... | 123/479 |
| 6,755,076 B1 * | 6/2004 | Schmidt et al. ............... | 73/116 |
| 2002/0173898 A1 * | 11/2002 | Itoyama et al. ............. | 701/104 |
| 2003/0154806 A1 * | 8/2003 | Rueger ....................... | 73/865.9 |

OTHER PUBLICATIONS

David P. Schmidt, Tzay-Fa Su, Kayhan H. Goney, P.V. Farrell & M.L. Corrandini, "Detection of Cavitation in Fuel Injector Nozzles," (Engine Research Center at the University of Wisconsin).
Timothy J. Callahan & Gary D. Bourn, "Investigation of Diesel Spray Penetration, Vaporization, and Combustion in a Pilot-Ignited Natural Gas Engine," 03-9074 (Southwest Research Institute 2003).

(Continued)

*Primary Examiner*—Eric S. McCall
(74) *Attorney, Agent, or Firm*—Elias P. Soupos; Susan L. Lukasik; Jeffrey P. Calfa

(57) ABSTRACT

An apparatus and method for measuring the pressure of a fluid near discharge ports 409 in a nozzle 213 of a fuel injector 201 are described. A fuel injector 201 is charged with fluid from a fluid tank 203 by a fuel pump 205. Upon activation of the fuel injector 201, the fluid is discharged from the nozzle 213. Fluid pressure in the nozzle 213 is communicated to a pressure sensor 215 through an orifice 411 in the nozzle 213. The pressure sensor 215 measures fluid pressure near the discharge ports 409 during fuel injector 201 operation.

7 Claims, 3 Drawing Sheets

OTHER PUBLICATIONS

"Standard Test Method for Shear Stability of Polymer Containing Fluids Using a European Diesel Injector Apparatus," D6278-02 (ASTM International 2003) <www.astm.org>.

"Evaluation of the Mechanical Shear Stability of Lubricating Oils Containing Polymers," (Fuel Injection Pump) CEC L-14-A-93 (Co-ordinating European Council 2003) <www.cectests.org>.

* cited by examiner

FIG. 3
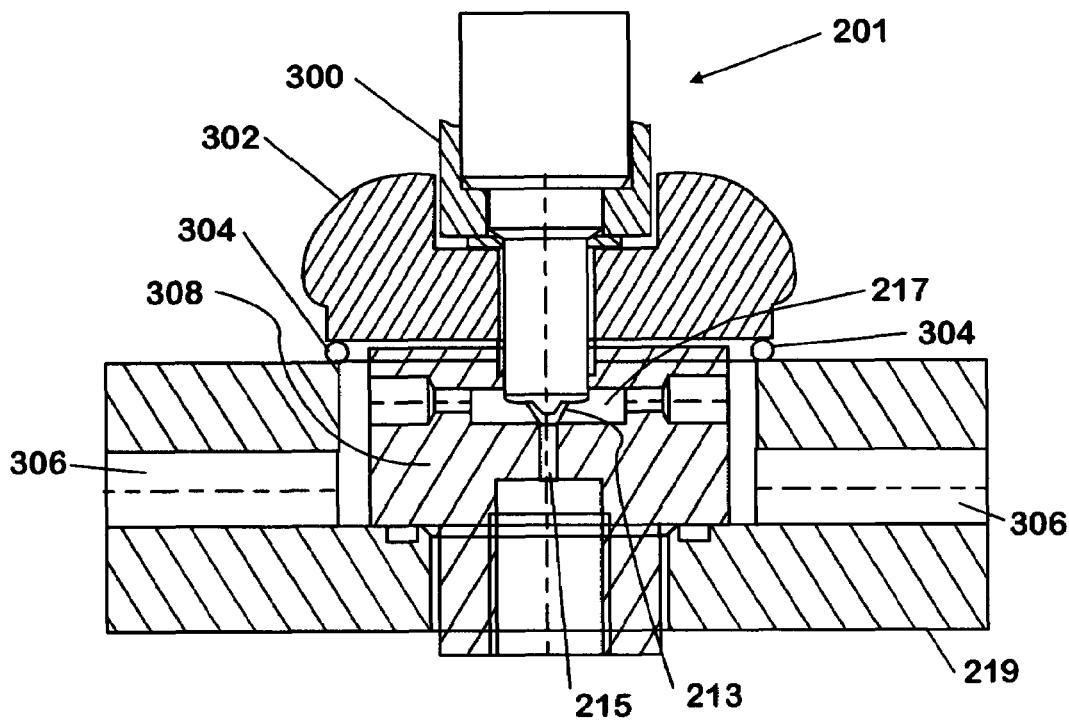
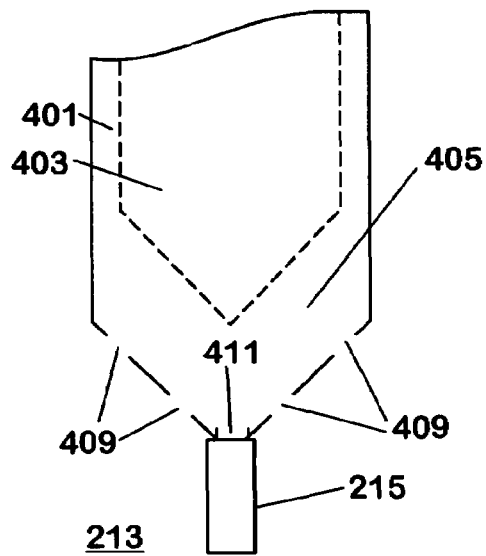
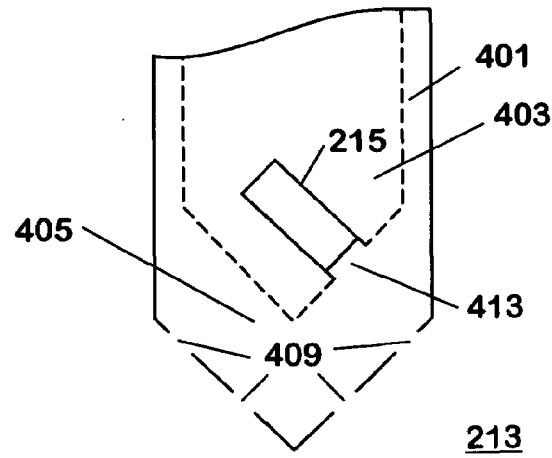
FIG. 4a
FIG. 4b

APPARATUS AND METHOD FOR EVALUATING FUEL INJECTORS

FIELD OF THE INVENTION

The present invention relates to fuel injectors, including, but not limited to, the measurement of the pressure of fluid before it is discharged from a fuel injector nozzle.

BACKGROUND OF INVENTION

Devices and methods for testing the performance of high-pressure fuel injectors, such as those commonly used in diesel engines, are known. Generally, the testing devices or methods are used to: 1) evaluate the spray pattern of a fluid discharged from the injector nozzle; 2) measure the flow rate of fluid from the injector; 3) determine the lubricating or fouling characteristics of the fluid in the fuel injector; or 4) measure the pressure of fluid in the fuel injector. Because of environmental requirements for cleaner burning diesel engines, control of the fluid pressure, and therefore measurement of fluid pressure near the nozzle outlets of the fuel injector, is important in determining fuel injector performance. The fluid pressure at the nozzle discharge ports impacts fuel combustion patterns and associated formation of by-product air pollutants.

Previously, the pressure of the fluid supplied to a fuel injector is measured at a fuel rail that is downstream of a fuel pump, but before the fuel injector. As shown in FIG. 1, a fuel injector 101 is charged with fluid from a fluid tank 103 by a fuel pump 105 via a fuel rail 107. A pressure sensor 109, such as a strain-gauge pressure sensor, measures the fluid pressure in the fuel rail 107. A pressure regulator 111, which is connected to the fuel rail 107, maintains the pressure in the fuel rail 107 during fuel injector 101 operation.

Prior methods use a strain gauge type pressure sensor to measure fluid pressure. Strain-gauge type pressure sensors suffer from distortion of the pressure measurement due to mechanical stresses induced in high-pressure applications. Placing of pressure sensors in the fluid channels and cavities inside the fuel injector nozzle is known. The mounting of pressure sensors in the fluid channels and cavities within the fuel injector nozzle is difficult, and disrupts both fluid flow patterns and the metering of the fluid.

Accordingly, there is a need for a method of measuring fluid pressure of a fuel injector, which method does not disturb fluid flow patterns or the metering of fluid discharged from the fuel injector.

SUMMARY OF INVENTION

An apparatus and a method for the measurement of the pressure of a fluid, such as diesel fuel or gasoline, near the nozzle of a fuel injector are provided. A fuel injector testing apparatus includes a fuel injector that is connected to a fluid supply system and has a nozzle with at least one discharge port. An orifice near the discharge ports in the nozzle communicates fluid to a pressure sensor that measures fluid pressure.

In a method of the present invention, a fuel injector is charged with a fluid, the fluid is discharged from the fuel injector, and the fluid pressure is measured near the discharge of the fuel injector.

BRIEF DESCRIPTION OF THE DRAWINGS

FIG. 3 illustrates an embodiment of a fuel injector testing apparatus for measuring fluid pressure at the nozzle of the fuel injector in accordance with the invention.

FIG. 4a illustrates a pressure sensor in relation to the nozzle of the fuel injector in accordance with the invention.

FIG. 4b illustrates a pressure sensor in relation to a needle of the fuel injector in accordance with the invention.

DETAILED DESCRIPTION OF THE INVENTION

The present invention includes an apparatus and method for measuring fluid pressure near or within the nozzle of a fuel injector. The present invention includes the communication of high-pressure fluid from a fluid cavity in the nozzle to a pressure sensor for pressure measurement. Fluid pressure is measured near the fuel injector discharge by one or more pressure sensors. The pressure sensors are capable of measuring changes in fluid pressure without disrupting normal fluid injection and metering.

Figure 1:
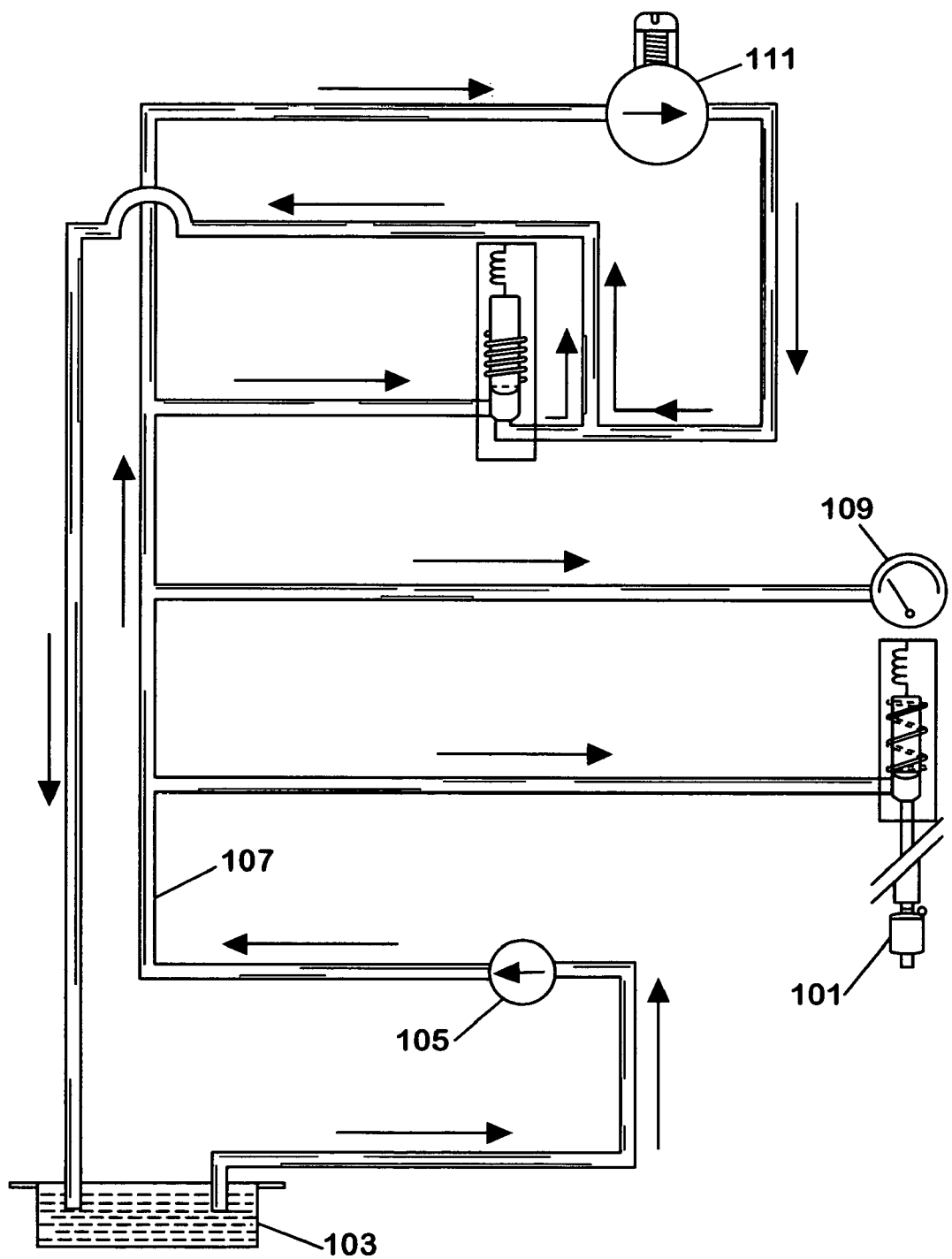
FIG. 1 illustrates a known apparatus for measuring pressure at a fuel rail.
Figure 2:
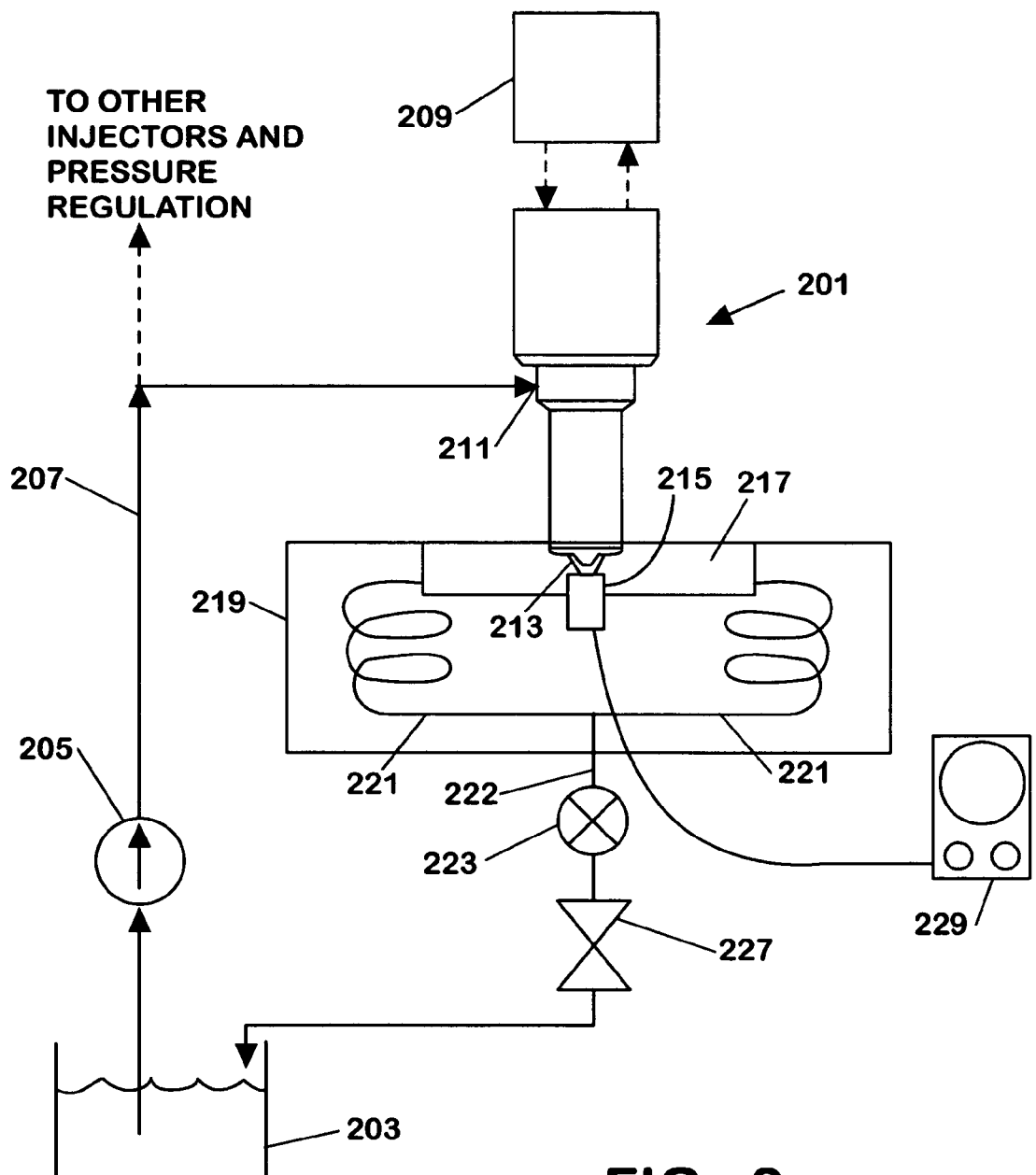
FIG. 2 illustrates an apparatus for measuring fluid pressure at a nozzle of a fuel injector in accordance with the invention.

FIG. 2 shows an apparatus for testing a fuel injector 201. The apparatus includes a fluid tank 203 that supplies a fuel pump 205. The fuel pump 205 discharges into a fuel rail 207 that is connected to one or more fuel injector inlets 211. When the apparatus is a test engine, the fuel rail 207 may be connected to more than one fuel injector. Further, the fuel rail 207 may be connected to a pressure regulation device (not shown) that controls the fluid pressure in the fuel rail 207. An actuator 209 controls the injection of fuel into and through the fuel injector 201, and the fuel injector 201 includes a nozzle 213 through which fuel is discharged.

An actuator 209 is operably connected to the fuel injector 201, and controls the discharge of fluid from a nozzle 213 by controlling the position of a needle 403 (see FIG. 4a) inside the nozzle 213. Fuel injector activation may be mechanical, hydraulic, electronic, and so forth.

Fluid from the nozzle 213 is discharged into a chamber 217 that functions as a fluid receiver or simulates a combustion chamber of an internal combustion engine. Fluid from the chamber 217 exits through drain lines 221 that combine at a fluid conduit 222 that feeds the fluid to a flow meter 223. The flow meter 223 measures the flow of the fluid discharged after each operation of the fuel injector 201. For simulation of fuel injector operation in high-pressure diesel engines, the fluid may pass through a pressure control valve 227 that controls the operating pressure of the apparatus. The fluid returns to fluid tank 203 for continued use in the apparatus. Alternatively, the fluid may pass into a fluid collector where the fluid accumulates and is not continuously returned to the fuel injector 201. A holder 219 supports the components of the apparatus.

The pressure sensor 215 is disposed near, within, or adjacent to the orifice 411 to facilitate measurement of fluid pressure. For example, the pressure sensor 215 may be mounted adjacent to an orifice 411, such that fluid pressure inside the nozzle 213 is communicated through the orifice 411 to the pressure sensor 215 that is connected to a monitoring device 229. Optimally, the pressure sensor 215, such as a high-precision piezoelectric quartz transducer model number 4067A2000 available from Kistler Internationale A.G., is capable of measuring rapidly changing high pressures typical of diesel engine fuel injector operation.

An embodiment shown in FIG. 3 depicts the mounting of the fuel injector 201 such that a metal-to-metal leak-resistant seal is formed between the pressure sensor 215 and the nozzle 213. In this embodiment, the fuel injector 201 is mounted to a test block 302 by a cone nut 300. The nozzle 213 extends from the test block 302 into the chamber 217 within an adaptor 308. The pressure sensor 215 is mounted to and held in place by the adaptor 308 and presses against the nozzle 213. The holder 219 supports the adaptor 308. A seal 304 is mounted between the holder 219 and the test block 302. Drain channels 306 from the chamber 217 continue through the holder 219. The open ends of the drain channels 306 form one end of the drain lines 221.

A method of the present invention includes the step of charging the fuel injector 201 with a fluid. For tests that simulate diesel engine operation, the fluid may be pressurized, for example, up to 2,000 bar before the fuel injector 201 is charged with the fluid. Fluid from the nozzle 213 is discharged, and the fluid pressure near or within the nozzle 213 is measured by the pressure sensor 215.

During the operation of the apparatus, fluid is drawn from the fluid tank 203 and into the fuel pump 205. The fluid passes from the fuel pump 205 into the fuel rail 207 and into the fuel injector 201 via a fuel injector inlet 211. Upon activation of the fuel injector 201 by the actuator 209, the fluid passes through and is discharged from the nozzle 213. Fluid that is discharged from the nozzle 213 enters the chamber 217, and exits through the drain lines 221. Fluid in the drain lines 221 combines in the combined fluid conduit 222. The combined fluid flows through the flow meter 223, which measures flow rate of the fluid discharged after each injection of fluid. Fluid flows through a pressure control valve 227, which controls the operating pressure of the apparatus. The fluid exits the pressure control valve 227 and empties into the fluid tank 203.

The pressure sensor 215 generates a signal that is sent to the monitoring device 229. The monitoring device 229 stores, displays, and/or prints fluid pressure during operation of the apparatus.

The present invention is not limited to a fuel injector with an orifice for measuring pressure at a tip of the nozzle 213. Orifices may be located at different positions on or within the nozzle 213, and orifices may be located in the needle 403.

As shown in FIG. 4a, one embodiment of the present invention provides for pressure measurement at a nozzle 213. A needle 403 is slideably mounted inside the nozzle 213, and moves up and down axially within the fuel injector 201. A fluid cavity 405 exists between the needle 403 and the nozzle 213. As shown in the figures, the lower surface of the needle 403 and the Inner surface of the nozzle 213 form at least a part of the outer boundary 401 of the fluid cavity 405.

The nozzle 213 has one or more discharge ports 409. In addition to the discharge ports 409, the nozzle 213 has at least one orifice 411. As shown in FIG. 4a, the orifice 411 is located adjacent to the outer boundary of the fluid cavity 405. The pressure sensor 215 is mounted adjacent to the orifice 411 such that fluid in the fluid cavity 405 is communicated to the pressure sensor 215.

As shown in FIG. 4b, the pressure sensor 215 may alternatively be mounted adjacent to an orifice 413 disposed in the needle 403. In this embodiment, the orifice 413 is located adjacent to the fluid cavity 405. The pressure sensor 215 is adjacent to the orifice 413, such that fluid pressure in the fluid cavity 405 is communicated to the pressure sensor 215. This alternative is applicable for the testing of fuel injectors in diesel engines because the pressure sensor is not mounted in the combustion chamber. In either embodiment, the pressure sensor 215 is in communication with the fluid cavity 405 through either orifice 411 or 413, and a leak-resistant seal is advantageously formed between the nozzle 213 or the needle 403 and the pressure sensor 215.

Upon activation of the fuel injector 201, the actuator 209 induces axial movement of the needle 403 relative to the nozzle 213. The movement of the needle 403 controls the flow of fluid into the nozzle 213, and eventually out of the discharge ports 409 in the nozzle 213. As the needle 403 moves, the size of the fluid cavity 405 changes and fluid either enters or exits the fluid cavity 405 as the position of the needle 403 allows. When the needle 403 moves to force fluid out the nozzle 213, fluid in the fluid cavity 405 is discharged through the discharge ports 409 in the nozzle 213.

In one embodiment of the present invention, the movement of the needle 403 allows the fluid in the fluid cavity 405 to be ejected from the nozzle 213 through the discharge ports 409 and into the chamber 217. At the same time, the fluid is in communication with the pressure sensor 215 through the orifice 411 in the nozzle 213. The pressure sensor 215 measures the pressure of the fluid in the fluid cavity 405. During fuel injector activation and as the position of the needle 403 changes, the pressure of the fluid in the fluid cavity 405 may increase or decrease, and may do so rapidly.

Alternatively, the fluid in the fluid cavity 405 may be forced out of the nozzle 213 through the discharge ports 409 in the nozzle 213, and at the same time, the fluid is in communication with the pressure sensor 215 through the orifice 413 in the needle 403. The pressure sensor 215 detects and/or measures the fluid pressure in the fluid cavity 405.

In a method of the present invention, the fuel injector 201 is charged with a fluid, the fluid is discharged from the nozzle 213 of the fuel injector 201, and the pressure of the fluid is measured in close proximity to discharge ports 409 in the nozzle 213.

The method may be utilized to develop new fuel injectors, to test commercially produced fuel injectors, and so forth. A nozzle 213, which may be interchangeable on different types or designs of fuel injectors, is provided. The nozzle 213 has an orifice 411 in close proximity to the discharge ports 409. The nozzle 213 is installed on the fuel injector, and the fuel injector is tested. After the test is complete, the nozzle 213 may be removed, and may be utilized to test other fuel injectors. The original nozzle may then be replaced on the tested fuel injector. Alternatively, the fuel injector 201 may be modified as shown and described with respect to FIG. 4b.

Alternatively, the fuel injector 201 may randomly or otherwise selected from a lot of commercially produced or otherwise manufactured fuel injectors 201. The nozzle 213 is removed from the selected fuel injector 201, and an orifice 411 is drilled in the nozzle 213. The nozzle 213 with the orifice 411 is reinstalled on the fuel injector 201, and the fuel injector 201 is tested. Upon completion of the testing, the fuel injector 201 is either discarded or rebuilt by installing a new nozzle.

An advantage of the present invention is the measurement of fluid pressure near or within the nozzle 213 of the fuel injector 201. The fluid pressure in the fluid cavity 405 between the nozzle 213 and the needle 403 may be referred to as sac pressure. Both the pressure sensor type and location may affect accurate measurement of sac pressure. Because piezoelectric quartz pressure transducers are a type of pressure sensor that is less susceptible to distortion caused by mechanical stresses induced, for example, in high-pressure applications, this type of pressure sensor is advantageously utilized to measure high fluid pressures, such as diesel fuel injector sac pressures or pressures changes in fluid cavities generally. Piezoelectric quartz transducers may advantageously be utilized in a high-pressure test apparatus or in test engines, such as diesel engines. Piezoelectric quartz transducers may advantageously be used to monitor diesel engine combustion chamber events or to indicate fluid flow from a fuel injector.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A fuel injector for an internal combustion engine comprising:
    a nozzle disposed at a distal end of the fuel injector and having at least one discharge port;
    a needle slideably mounted inside the fuel injector and the nozzle;
    a fluid cavity disposed in the nozzle;
    a pressure sensor arranged to measure pressure in the fluid cavity; and
    an orifice disposed in the needle and disposed along an outer boundary of the fluid cavity, wherein the pressure sensor is disposed in the orifice.

2. The apparatus of claim 1, wherein the pressure sensor is a piezoelectric quartz transducer.

3. A method comprising the steps of:
    charging a fuel injector for an internal combustion engine with fluid;
    discharging the fluid from at least one discharge port in a nozzle disposed at a distal end of the fuel injector;
    communicating fluid to a pressure sensor through a first orifice disposed in the nozzle;
    communicating fluid to the pressure sensor through a second orifice in a needle inside the nozzle of the fuel injector; and
    measuring fluid pressure near the at least one discharge port with the pressure sensor.

4. The method of claim 3, further comprising the step of containing the fluid discharged from the nozzle in a chamber.

5. The method of claim 4, further comprising the step of controlling the operating pressure of the chamber.

6. The method of claim 3, further comprising the step of measuring the fluid discharge rate after each discharge of fluid from the nozzle of the fuel injector.

7. The method of claim 3, wherein the pressure sensor is a piezoelectric quartz transducer.

* * * * *